United States Patent
Isberg et al.

(10) Patent No.: US 6,587,674 B1
(45) Date of Patent: Jul. 1, 2003

(54) ARRANGEMENT AND METHOD BY A MOBILE TRANSCEIVER

(75) Inventors: Johanna Brita Isberg, Lund (SE); Mikael Dahlkvist, Södra Sandby (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/099,922

(22) Filed: Jun. 18, 1998

(30) Foreign Application Priority Data

Jun. 19, 1997 (SE) .............................. 9702369
Sep. 9, 1997 (SE) .............................. 9703254

(51) Int. Cl.$^7$ ................................ H04B 1/38
(52) U.S. Cl. ..................... 455/90; 455/550; 455/575
(58) Field of Search ..................... 455/550, 90, 575; 379/433, 428

(56) References Cited

U.S. PATENT DOCUMENTS

| | | | | |
|---|---|---|---|---|
| 4,845,772 A | * | 7/1989 | Metroka et al. | 379/433 |
| 4,897,873 A | | 1/1990 | Beutler et al. | 379/433 |
| 5,185,790 A | | 2/1993 | Mischneko | 379/433 |
| 5,327,584 A | * | 7/1994 | Adachi et al. | 455/89 |
| 5,335,367 A | * | 8/1994 | Adachi et al. | 455/90 |
| 5,335,368 A | * | 8/1994 | Tamura | 455/90 |
| 5,497,506 A | * | 3/1996 | Takeyasu | 455/89 |
| 5,542,106 A | * | 7/1996 | Krenz et al. | 455/90 |
| 5,584,054 A | * | 12/1996 | Tyneski et al. | 455/89 |
| 5,630,211 A | * | 5/1997 | Nagai | 455/89 |
| 5,668,867 A | * | 9/1997 | Nagai | 379/433 |
| 5,898,933 A | * | 4/1999 | Kaschke | 455/575 |
| 5,918,188 A | * | 6/1999 | Doran | 455/575 |
| 5,923,751 A | * | 7/1999 | Ohtsuka et al. | 379/433 |
| 5,956,625 A | * | 9/1999 | Hansen et al. | 455/90 |
| 6,073,027 A | * | 6/2000 | Norman et al. | 455/550 |

FOREIGN PATENT DOCUMENTS

| | | | |
|---|---|---|---|
| EP | 0792054 | * | 2/1997 |
| EP | 0 792 054 A2 | | 8/1997 |
| GB | 2 255 448 A | | 11/1992 |
| GB | 2 293 726 A | | 4/1996 |

* cited by examiner

*Primary Examiner*—Nay Maung
*Assistant Examiner*—Joy K. Contee
(74) *Attorney, Agent, or Firm*—Jenkens & Gilchrist, P.C.

(57) ABSTRACT

The present invention relates to the field of arrangements and methods by a mobile transceiver. The invention solves the problem of how to obtain a mobile telephone terminal (21) with a lid (25) and a corresponding function with automatic reception of an incoming call when the lid (25) is opened, such as a mobile telephone terminal with an active lid, where also such services are to become available that need access to a keypad (29) covered by the lid (25) and which allows a user to handle the incoming call in other ways than only receiving the call. The problem is solved in that the mobile telephone terminal (21) comprises means (41) that enable the user on demand to deactivate the automatic reception of the incoming call.

13 Claims, 5 Drawing Sheets

ARRANGEMENT AND METHOD BY A MOBILE TRANSCEIVER

TECHNICAL FIELD

The present invention relates to the field of arrangements and methods by a mobile transceiver; in particular the invention relates to the part of this field that relates to a mobile telephone terminal and processing of an incoming call to the mobile telephone terminal.

STATE OF THE ART

A number of models of mobile telephone terminals available on the market, such as e.g. the Ericsson GF337, are equipped with a lid (flip) which can be arranged to cover important means of the mobile telephone terminal, such as e.g. a keypad and a display. The lid serves as a mechanical protection that prevents unintentional influence on these important means.

When a mobile telephone terminal receives an incoming call the user is usually required to perform a number of actions, such as e.g. pushing out the antenna and press the SEND key (YES key) in order to receive the incoming call. On a mobile telephone terminal having a lid such as the above described the user must naturally also open the lid in order to get access to the SEND key.

In order to reduce the number of actions the user has to perform in order to receive an incoming call, a number of models of mobile telephone terminals have been equipped with a so-called active lid (active flip). When such a mobile telephone terminal, with its active lid closed, receives an incoming call and the user opens the active lid, the same effect is obtained as if the user had pressed the SEND key, and the call is thus automatically received when the user opens the active lid.

Examples of mobile telephone terminals having active lids are described in the patent documents U.S. Pat. No. 4,897,873 and U.S. Pat. No. 5,185,790.

There are however drawbacks with the active lid. In some mobile telephone systems, such as e.g. GSM (the Global System for Mobile communications), the system must also provide services where the user is permitted to handle an incoming call in other ways than receiving it. Examples of such services in the GSM system are "User Determined Busy" and "Call Deflection". These services are described in GSM Rec. 02.30 and GSM Rec. 02.72 respectively. In order to activate these services, the user must perform other key pressing actions than SEND. For example, regarding the "User Determined Busy", the user must press 0 SEND, alternatively END (NO). These services can obviously not be used with a mobile telephone terminal equipped with an active lid since there is no time for the user to press any key due to the fact that the call is automatically received when the active lid is opened.

SUMMARY OF THE INVENTION

The present invention addresses a problem by a mobile telephone terminal having an active lid (or a corresponding arrangement). The problem is to make available services that allow a user to handle an incoming call in other ways than merely receiving the incoming call and which require access to a keypad (or corresponding arrangement) covered by the lid when the lid is closed. The mobile telephone terminal must at the same time retain the function of automatic reception of an incoming call when the lid is opened.

The above stated problem is in general terms solved in that the mobile telephone terminal comprises means that enable the user on his/her demand to deactivate the automatic reception of the incoming call. The purpose of the invention is hence that the incoming call shall be automatically received, such as in a mobile telephone terminal having an active lid, only when the user wishes so, otherwise not.

The above stated problem is solved in more specific terms according to the invention by a mobile telephone terminal comprising a first detector generating a first detector signal corresponding to whether the lid is open or closed. The mobile telephone terminal also comprises an engaging element accessible to the user when the lid is closed. The engaging element is arranged to generate a second detector signal corresponding to whether the engaging element is engaged or not. The mobile telephone terminal is arranged to consider both the first and the second detector signal in order to decide whether or not to automatically receive the call when the lid is opened. Since the second detector signal is dependent on the action by the user on the engaging element, the user may thus by an appropriate action on the engaging element disable the automatic reception of the incoming call.

The above stated problem is also solved in more specific terms according to the invention by a mobile telephone terminal comprising means which delays the automatic reception of the incoming call a certain period of time after the opening of the lid. Since the lid is open the user of the mobile telephone terminal has access to the keypad of the mobile telephone terminal during this delay time. The mobile telephone terminal is to this effect arranged such that the automatic reception of the incoming call is deactivated if the user influences the keypad in any certain manner before the delay time has expired.

The invention is also a method to meet the purpose as stated above.

The invention will be described in more detail with the help of preferred embodiments and with reference to the attached drawings.

SHORT DESCRIPTION OF THE DRAWINGS

PREFERRED EMBODIMENTS

Figure 1:
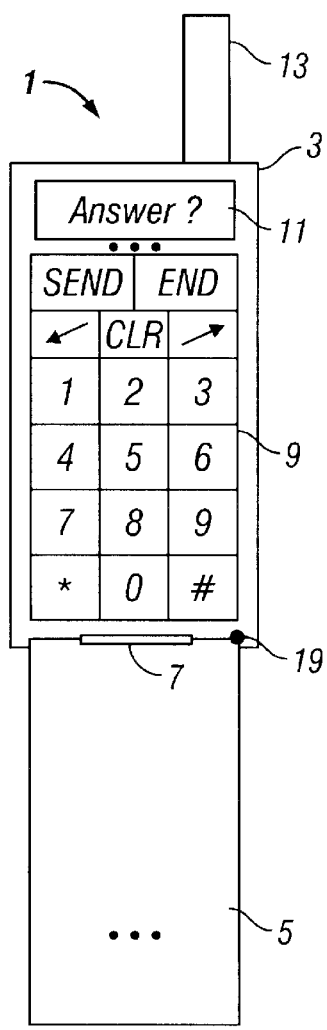
FIG. 1 shows a frontal view of a first mobile telephone terminal according to a generally known construction.

In FIG. 1 it is shown a frontal view of a first mobile telephone terminal 1 according to a generally known construction. The first mobile telephone terminal 1 comprises two parts, a main part 3 and a lid 5. The main part 3 and the lid 5 are movably arranged to each other by a fixed axial joint 7. The first mobile telephone terminal 1 comprises a keypad 9. The keypad 9 comprises, among others, a SEND key, a END key and numerical keys (0–9) that can be used to select a telephone number. In FIG. 1, the lid 5 is positioned in a first position (open) making the keys of the keypad 9 accessible to the user of the first mobile telephone terminal 1. The first mobile telephone terminal 1 further comprises a display 11 which is used to present information to the user of the first mobile telephone terminal 1. The first mobile telephone terminal 1 also comprises an antenna 13 which is used by the first mobile telephone terminal 1 when receiving and transmitting radio signals.

Figure 2:
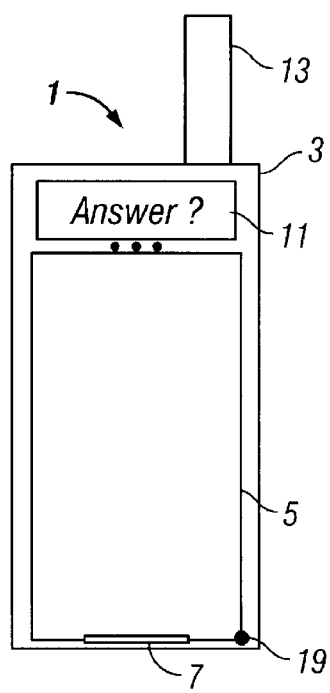
FIG. 2 shows another frontal view of the first mobile telephone terminal.

FIG. 2 shows another frontal view of the first mobile telephone terminal 1. The lid 5 is in FIG. 2 in a second position (closed). The lid 5 in its second position is protecting the keys of the keypad 9 from unintentional influence. The keys of the keypad 9 are also not accessible to the user. The lid 5 of the first mobile telephone terminal 1 is an active lid. Hence, the first mobile telephone terminal 1 comprises a first detector 19 for detection of whether the lid 5 is in its first position or second position. The first detector 19 is arranged to generate a first detector signal d1 corresponding to the lid 5 being in the first position or second position. An incoming call to the first mobile telephone terminal 1 is received, as already disclosed, automatically when the user brings the lid 5 into its first position (opening the lid 5). The first detector 19 detects the opening of the lid 5.

Figure 3:
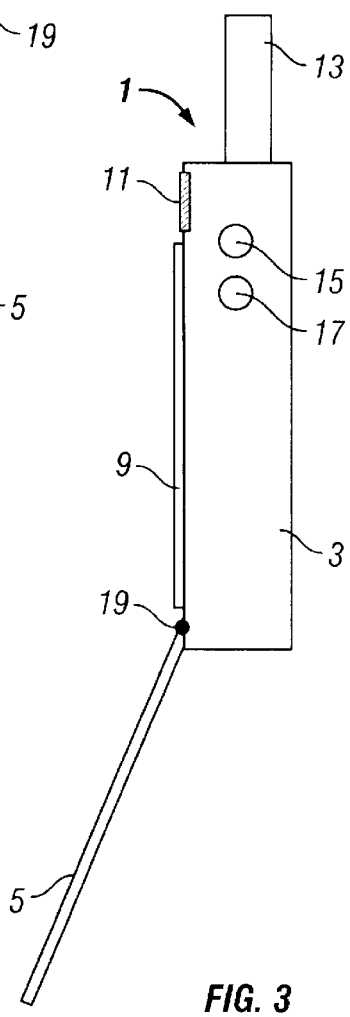
FIG. 3 shows a side view of the first mobile telephone terminal.

FIG. 3 shows a side view of the first mobile telephone terminal 1. The first mobile telephone terminal 1 comprises two volume keys 15 and 17 arranged on the side of the main part 3. The volume keys 15 and 17 are used by the user to control the sound volume in the first mobile telephone terminal 1. The lid 5 is in FIG. 3 in its first position and the volume keys 15 and 17 are also accessible to the user when the lid 5 is in its second position.

As already disclosed, it is not possible, with the first mobile telephone terminal 1 to use certain types of mobile telephone services, since an incoming call is automatically received when the lid 5 is opened.

The present invention will now be described with reference to FIGS. 4 to 6.

Figure 4:
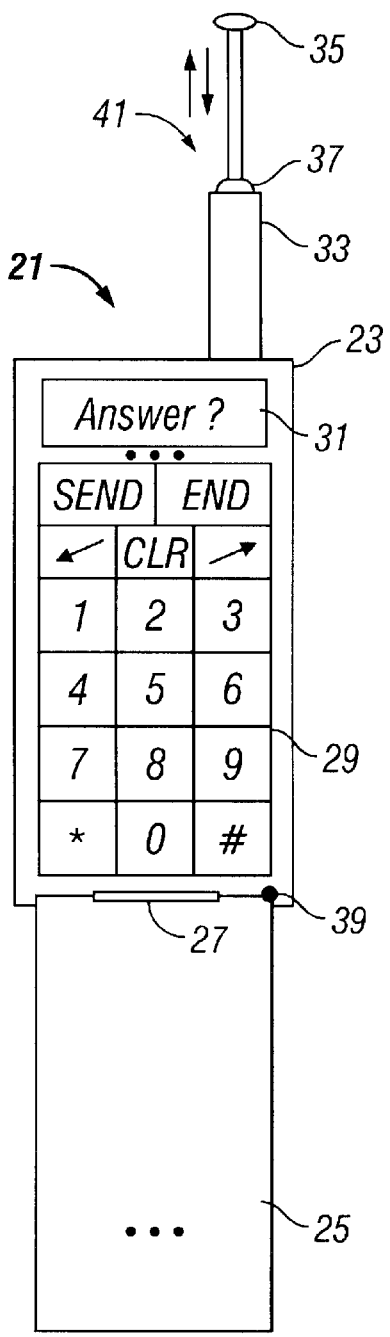
FIG. 4 shows a frontal view of a second mobile telephone terminal according to a generally known construction.

FIG. 4 shows a frontal view of a second mobile telephone terminal 21 according to the invention. The construction of the second mobile telephone terminal 21 corresponds in many respects to the construction of the first mobile telephone terminal 1 in FIGS. 1, 2 and 3. The second mobile telephone terminal 21 thus comprises, in correspondence with the first mobile telephone terminal 1, a main part 23, a lid 25, an axial joint 27, a keypad 29, a display 31, an antenna 33 and a first detector 39. The antenna 33 of the second mobile telephone terminal 21 also comprises an extractable and retractable antenna part 35, which by itself is an already well known feature in the field of mobile telephone terminals. In FIG. 4, the extractable and retractable antenna part 35 is shown in an extracted position. The second mobile telephone terminal 21 further comprises a second detector 37 for detecting whether the extractable and retractable antenna part 35 is extracted or retracted. The second detector 37 is arranged to generate a second detector signal d2 corresponding to whether the extractable and retractable antenna part 35 is extracted or retracted.

The extractable and retractable antenna part 35 in combination with the second detector 37 acts as an engaging element 41. The feature engaging element is to be interpreted as all types of elements which a user, by influencing these elements, can input any form of information to a mobile telephone terminal. Examples are such elements which comprises keys, wheels or any kind of control key with associated means for detecting the influence by the user of these elements. The feature engaging element comprises also means for voice control. Here, the term engaged engaging element means that the engaging element is influenced in a predetermined and detectable manner. The engaging element 41 in FIG. 4 is accessible to the user when the lid 25 of the second mobile telephone terminal 21 is in the second position (closed). The engaging element 41 is considered to be engaged when the extractable and retractable antenna part 35 is in the retracted position.

Figure 5:
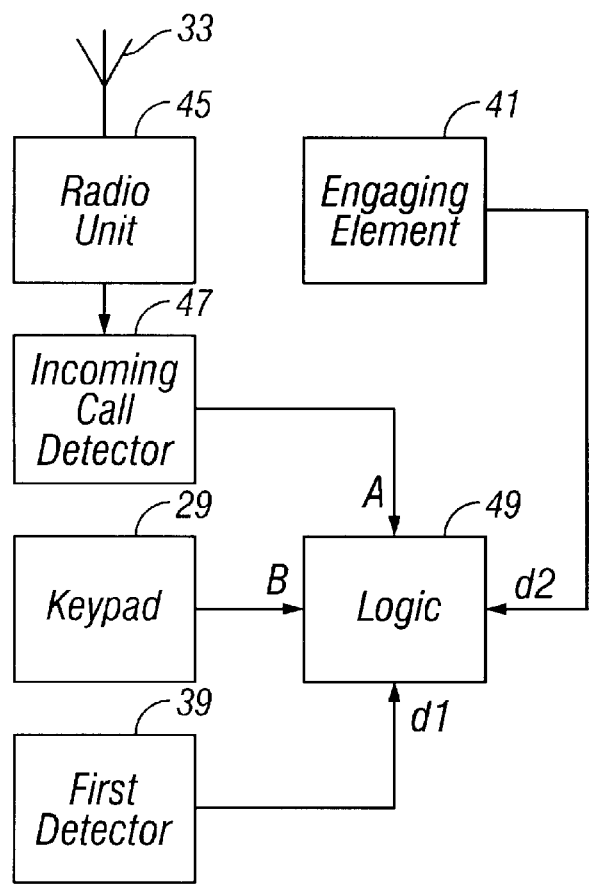
FIG. 5 shows a block diagram of the inner construction of the second mobile telephone terminal.

FIG. 5 shows a block diagram describing an internal construction of the second mobile telephone terminal 21. The second mobile telephone terminal 21 comprises a radio unit 45 which is connected to the antenna 33 of the second mobile telephone terminal 21. The radio unit 45 is arranged to receive and transmit radio signals via the antenna 33. The radio unit 45 is arranged to detect received radio signals and to emit a detected signal C corresponding to the detection of the received radio signals. The second mobile telephone terminal 21 comprises an incoming call detector 47. The incoming call detector is connected to the radio unit 45 and is by that arranged to receive the detected signal C. The incoming call detector 47 is arranged to analyze the. detected signal C and decide whether the second mobile telephone terminal 21 is receiving an incoming call or not. The incoming call detector 47 is further arranged to generate a first indication signal A corresponding to whether the second mobile telephone terminal 21 is receiving an incoming call or not. The second mobile telephone terminal 21 comprises a logic unit 49. The logic unit 49 is arranged to supervise and control the working of the second mobile telephone terminal 21. The logic unit 49 is connected to the incoming call detector 47 and is thereby arranged to receive the first indication signal A. The keypad 29 of the second mobile telephone terminal 21 is arranged to emit a second indication signal B corresponding to which of the keys of the keypad 29 is being pressed. The logic unit 49 is connected to the keypad 29 and is thereby arranged to receive the second indication signal B. The logic unit is further connected to the first detector 39 of the second mobile telephone terminal 21 and to the detector 37 belonging to the engaging element 41, and is thus arranged to receive the firsthand the second detector signal d1 and d2.

According to the present invention, the logic unit 49 is arranged to handle an incoming call to the second mobile telephone terminal 21, in dependence on the first and second detector signal dl and d2. FIG. 6 shows a flow chart describing an example according to the present invention how the second mobile telephone terminal 21 is arranged to work when receiving an incoming call.

Figure 6:
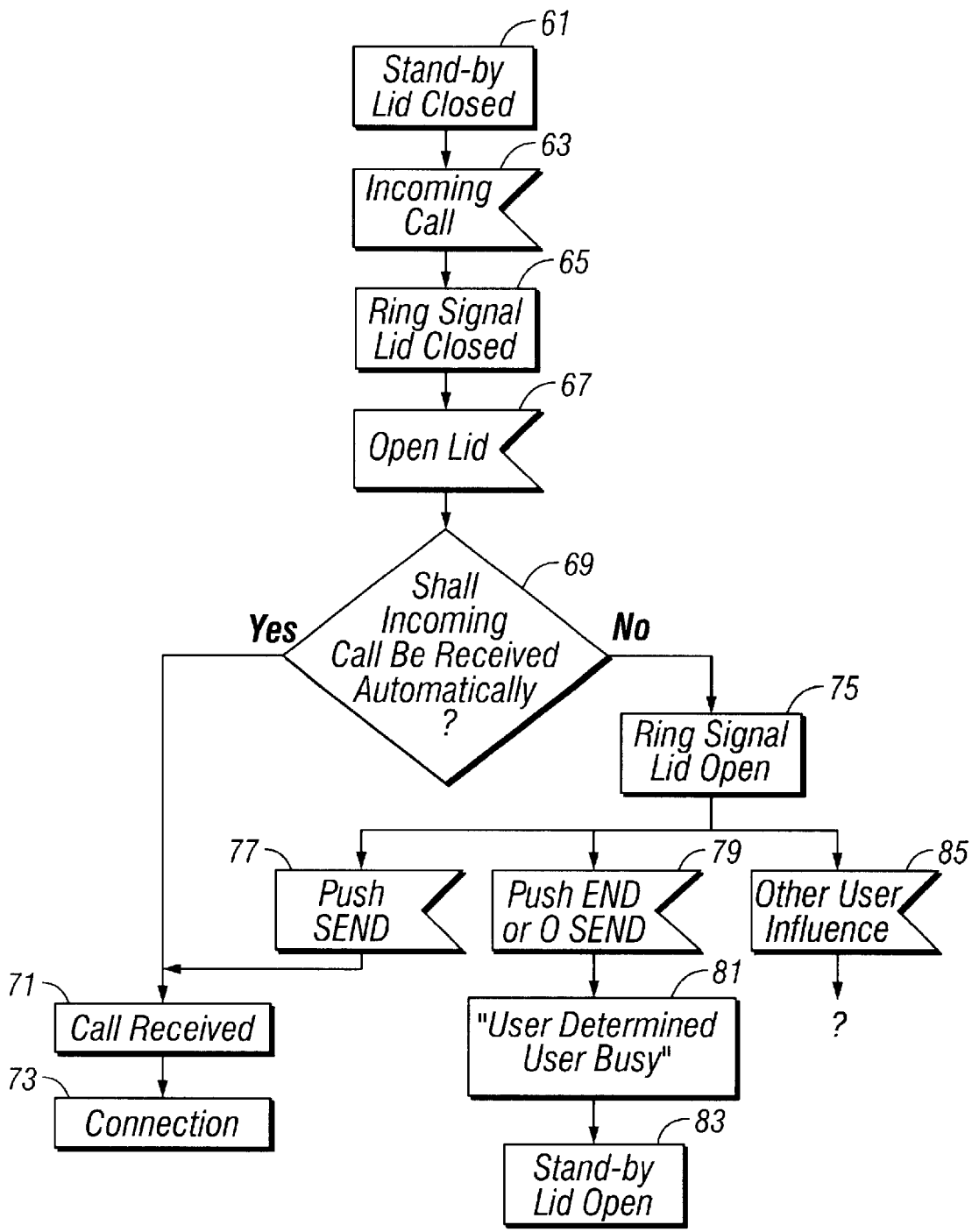
FIG. 6 shows a flow chart illustrating how the second mobile telephone terminal is arranged to work when receiving an incoming call.

The method shown in FIG. 6 commences with a first step 61 in which the second mobile telephone terminal 21 is in a so called stand-by mode with the lid 25 in the second position (closed).

The method shown in FIG. 6 continues with a second step 63 in which the second mobile telephone terminal 21 receives an incoming call. The logic unit 49 receives hereby information about the incoming call by the first indication signal A.

The method shown in FIG. 6 continues with a third step 65 where the logic unit, in response to the incoming call, initiates the second mobile telephone terminal 21 to emit a ring signal. The lid 25 of the second mobile telephone terminal 21 remains in the second position (closed).

The method shown in FIG. 6 continues with a fourth step 67 where the user brings the lid 25 of the second mobile telephone terminal 21 to the first position (opening the lid). The logic unit 49 receives hereby information about the lid 25 of the second mobile telephone terminal 21 being in the first position (open) by the first detector signal d1.

The method shown in FIG. 6 continues with a fifth step 69 where the logic unit 49 decides whether the incoming call is to be automatically received or not. The logic unit 49 is arranged to decide this taking into consideration the first and second detector signal d1 and d2. This decision entails, in the method exemplified in FIG. 6, that the incoming call is automatically received if the first detector signal d1 indicates that the lid 25 has been brought into the first position (open), and the second detector signal d2 indicates that the engaging element 41 has not been engaged at the same time, or within a predetermined time period before, when the lid was brought into the first position (was opened). The logic unit 49 may of course be arranged to make use of other criteria to decide whether the incoming call shall be received automatically. For example, the logic unit 49 may be arranged to decide that the incoming call shall be received automatically only in a case where the first detector signal d1 indicates that the lid 25 has been brought into the first position and the second indicator signal d2 indicates that the engaging element 41 was not engaged while the lid 25 was being brought into the first position (was opened).

If the logic unit 49 in the fifth step 69 in FIG. 6 decides that the incoming call is to be automatically received, a sixth step 71 is performed. In the sixth step 71 in FIG. 6 the logic unit 49 controls that the incoming call is received by the second mobile telephone terminal 21. The sixth step 71 in FIG. 6 is immediately followed by a seventh step 73 where a conversation is established.

If the logic unit 49 in the fifth step 69 in FIG. 6 decides that the incoming call is not to be automatically received, an eighth step 75 is performed. The eighth step 75 in FIG. 6 the logic unit 49 continues to initiating the second mobile telephone terminal 21 to emit ring signals with the lid 25 of the second mobile telephone terminal 21 being in the first position (open). What happens next depends on the user. The user, who now has access to the keypad 29 of the second mobile telephone terminal 21, decides, by influencing the keys of the keypad 29, how the incoming call shall be handled. A ninth 77, tenth 79 and eleventh 85 step shown in FIG. 6 indicate three ways of influencing the keys of the keypad.

The ninth step 77 in FIG. 6 entails the user deciding to receive the incoming call, and hence the user presses the SEND key. The logic unit 49 receives hereby information about this key pressing by the second indication signal B. After the ninth step 77, the method continues with the previously described sixth step 71, where the logic unit 49, as a response to the user pressing the key, controls the reception of the incoming call. The sixth step 71 is then followed by the seventh step, as already disclosed.

The tenth step in FIG. 6 entails the user pressing the END key or on the zero-key and the SEND key. The logic unit 49 receives information of this key pressing by the second indication signal B whereby the method in FIG. 6 continues with a twelfth step 81.

The twelfth step 81 in FIG. 6 entails that the logic unit 49 initiates the service "User Determined User Busy". The twelfth step 81 in FIG. 6 is followed by a thirteenth step 83 which entails that the second mobile telephone terminal 21 is returned to the stand-by mode, this time with the lid in the first position (open).

The eleventh step 85 in FIG. 6 entails the user performs any key pressing action other than the examples shown so far, whereby the logic unit 49, as a response to this key pressing initiates a corresponding service or function, indicated in FIG. 6 as a question mark. An example of such a service or function is "Call Deflection".

As discussed above, the engaging element 41 of the second mobile telephone terminal 21 is in the form of the extractable and retractable antenna part 35 in combination with the second detector 37. The second mobile telephone terminal 21 may of course be arranged to have any other form of engaging element with a function corresponding to that of the engaging element 41. For example, such other forms of engaging element may comprise a key and detector means for detecting whether the key is pressed or not.

Considering a mobile telephone terminal constructed as the first mobile telephone terminal 1, with its active lid and which also comprises engaging means (volume keys 15 and 17), originally intended for other purposes than the engaging element 41, which are accessible when the active lid is closed. Such a construction may of course be modified to an extent that the accessible engaging elements (volume keys 15 and 17) are used in a way corresponding to the engaging element 41 of the second mobile telephone terminal 21.

Figure 7:
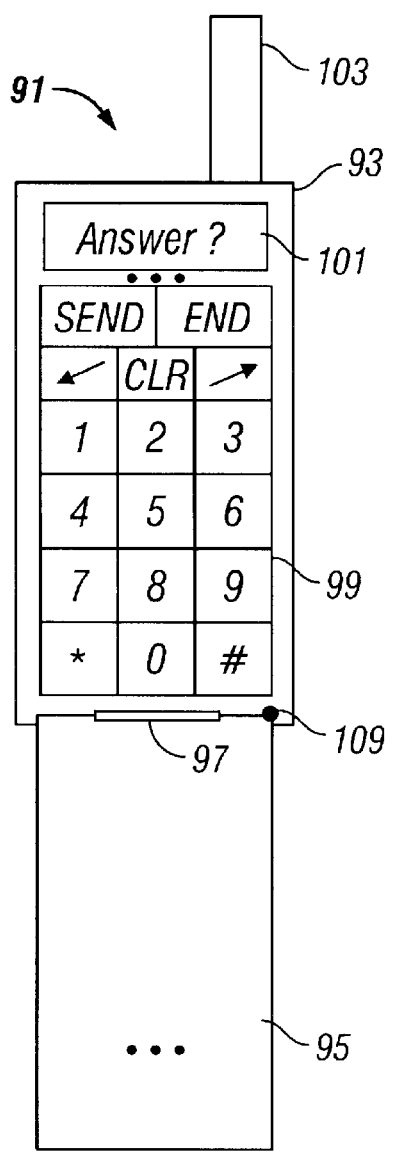
FIG. 7 shows a frontal view of a third mobile telephone terminal according to the present invention.

FIG. 7 shows a frontal view of a third mobile telephone terminal 91 according to the present invention. The construction of the third mobile telephone terminal 91 corresponds in many respects to the construction of the first mobile telephone terminal 1 in FIGS. 1, 2 and 3. The third mobile telephone terminal 91 thus comprises, in correspondence with the first mobile telephone terminal 1, a main part 93, a lid 95, an axial joint 97, a keypad 99, a display 101, an antenna 103 and a first detector 109.

Figure 8:
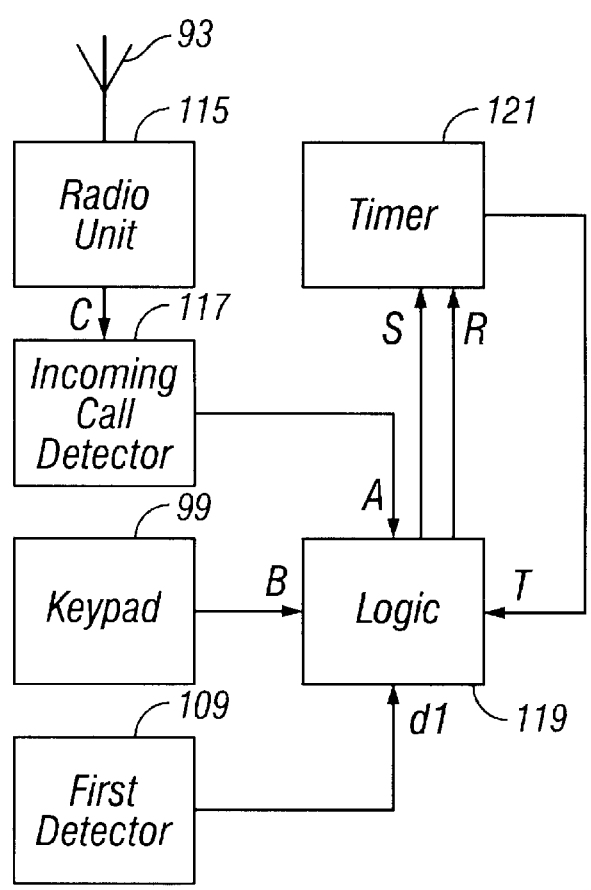
FIG. 8 shows a block diagram of the inner construction of the third mobile telephone terminal.

FIG. 8 shows a block diagram showing the inner construction of the third mobile telephone terminal 91. The inner construction of the third mobile telephone terminal 91 in FIG. 8 corresponds in many respects to the inner construction of the second mobile telephone terminal 21 in FIG. 5. Corresponding to the inner construction of the second mobile telephone terminal 21 in FIG. 5, the construction of the third mobile telephone terminal 91 in FIG. 8 thus comprises the following blocks: a radio unit 115, an incoming call detector 117, the keypad 99, the first detector 109 and a logic unit 119. In FIG. 8 the radio unit 115 is connected to the antenna 103 and the incoming call detector 117 to the radio unit 115, corresponding to FIG. 5. The logic unit 119 in FIG. 8 is connected to the incoming call detector 117, the keypad 99 and the first detector 109 and is thereby arranged to receive a first indication signal A, a second indication signal B and a first detector signal d1, corresponding to the logic unit 49 in FIG. 5. The block diagram in FIG. 8 further comprises a timer 121. The timer 121 is connected to the logic unit 119 and is thereby arranged to receive a start signal S and a reset signal R, that are generated by the logic unit 119. The logic unit 119 starts the timer with the start signal S. The timer 121 is thereby arranged to generate and emit a timer signal T corresponding to the time period lapsed since the timer 121 was started. The logic unit 119 stops and resets the timer 121 with the reset signal R. The logic unit 119 is connected to the timer 121 and is thereby arranged to receive the timer signal T.

Figure 9:
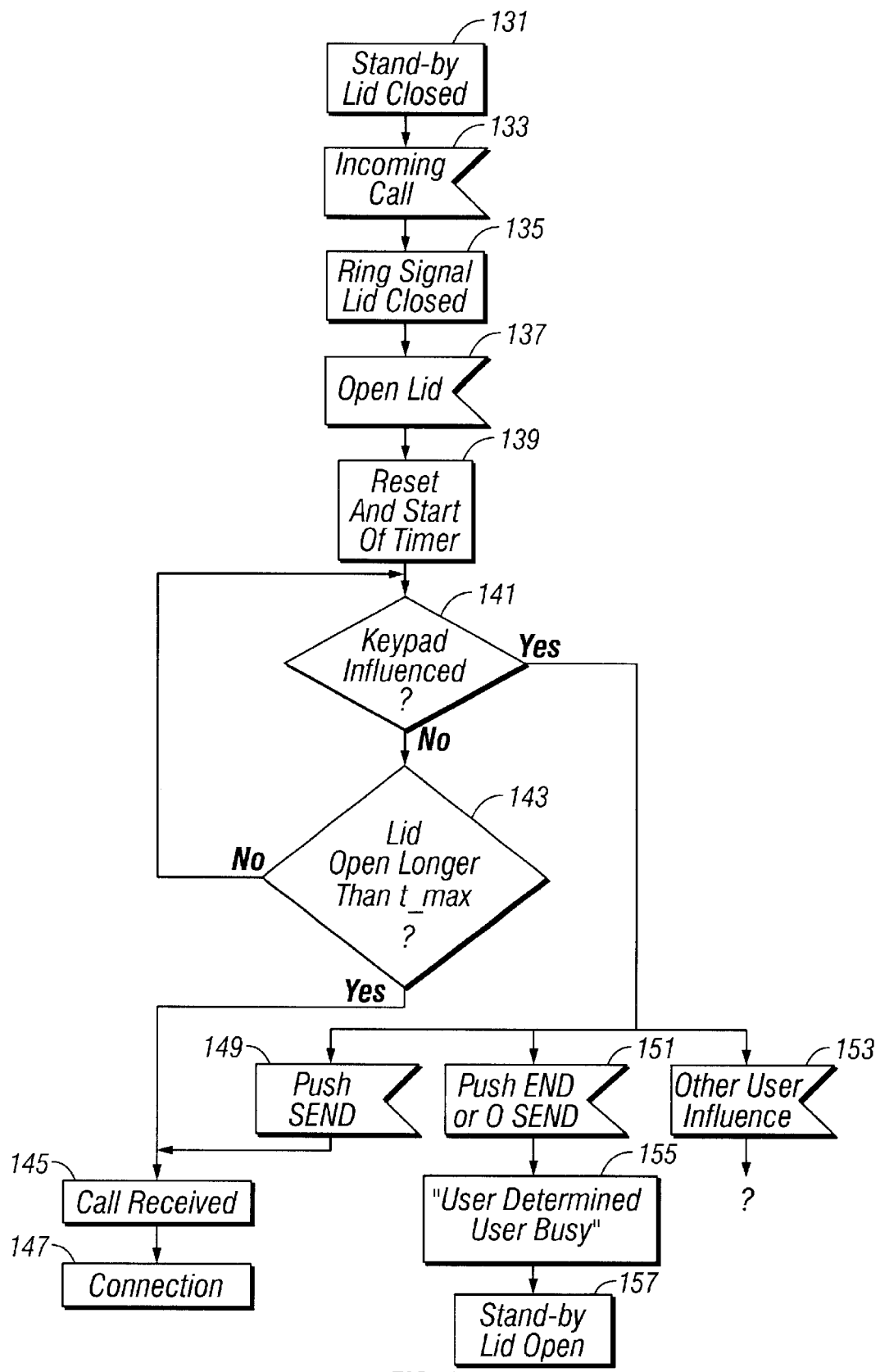
FIG. 9 shows a flow chart illustrating how the third mobile telephone terminal is arranged to work when receiving an incoming call.

FIG. 9 shows a flow chart describing an example according to the present invention of how the third mobile telephone terminal 91 is arranged to work when receiving an incoming call.

The method shown in FIG. 9 commences with a first step 131 in which the third mobile telephone terminal 91 is in a stand-by mode with the lid 95 in the second position (closed).

The method shown in FIG. 9 continues with a second step 133 in which the third mobile telephone terminal 91 receives an incoming call. The logic unit 119 receives hereby information about the incoming call by the first indication signal A.

The method shown in FIG. 9 continues with a third step 135 where the logic unit 119, in response to the incoming call, initiates the third mobile telephone terminal 91 to emit a ring signal. The lid 95 of the third mobile telephone terminal 91 remains in the second position (closed).

The method shown in FIG. 9 continues with a fourth step 137 where the user brings the lid 95 of the third mobile telephone terminal 91 to the first position (opens the lid). The logic unit 119 receives hereby information about the lid 95 of the third mobile telephone terminal 91 being arranged in the first position (open) by the first detector signal d1.

The method shown in FIG. 9 continues with a fifth step 139 where the logic unit 119 resets the timer 121 with the reset signal R and thereafter starts the timer 121 with the start signal S.

The method shown in FIG. 9 continues with a sixth step where the logic unit, in dependence on the second indication signal B, decides whether or not the keypad 99 has been influenced in a predetermined manner. If the logic unit 119 finds in the sixth step that the keypad has not been influenced in a predetermined manner, the method in FIG. 9 continues with a seventh step 143.

The seventh step 143 in FIG. 9 entails the logic unit 119 deciding, in dependence on the timer signal T, whether or not the lid 95 of the third mobile telephone terminal 91 has been in the first position (open) for a period of time longer than a certain predetermined time period t_max. If the logic unit, during the seventh step 143, finds that the lid 95 has not been open for a longer period of time than the predetermined time period t_max, the sixth step 141 in FIG. 9 is performed again. Otherwise, an automatic reception of the incoming call is performed, whereby an eighth and a ninth step 145 and 147 in FIG. 9 are performed, entailing that the incoming call is received and that a connection is established.

If the logic unit 119 in the sixth step 141 in FIG. 9 finds that the keypad 99 has been influenced by the user in the predetermined way, the method will hereafter be depending on the actions of the user. In the method shown in FIG. 9, three different predetermined ways are exemplified in a tenth, an eleventh and a twelfth step 149, 151 and 153.

The tenth step 149 in FIG. 9 entails that the user has pushed the SEND key. This leads to the eighth and the ninth step 145 and 147 in FIG. 9, where the incoming call is received and a connection is established.

The eleventh step 151 in FIG. 9 entails that the user has pushed either the END key or the number key 0 and the SEND key. This leads to a fourteenth step 155 in FIG. 9, entailing that the logic unit 119 initiates the service "User Determined User Busy". The fourteenth step 155 in FIG. 9 is followed by a fifteenth step 157, entailing that the third mobile telephone terminal 91 once again is in stand-by mode, this time with the lid 95 in the first position (open).

The twelfth step 153 in FIG. 9 entails that the user has influenced the keypad 99 in another way than the examples already shown, whereby the logic unit 119 as a response to this influence initiates a corresponding service or function, as indicated by a question mark in FIG. 9. An example of such a service or function is "Call Deflection".

Thus, the third mobile telephone terminal 91 delays the automatic reception of the incoming call during the predetermined time period t_max after the event that the parts 93 and 95 have been arranged in the first position. Thus, the user has access to the keypad 99 during the predetermined time period t_max. If the user during this predetermined time period t_max influences the keypad 99 of the third mobile telephone terminal 91 in the predetermined way, the automatic reception is deactivated and the desired service or function can be initiated having regard to the influence on the keypad 99 by the user.

The timer 121 of the third mobile telephone terminal 91 is arranged to generate the timer signal T in such a way that it indicates the time lapsed since the timer 121 was started. The important point is of course that it is possible from the timer signal T to determine whether or not the predetermined time period t_max has lapsed. The timer 121 could thus be arranged to generate the timer signal T in another way. For example, the timer 121 could be arranged to generate the timer signal T in binary form such that it has a value corresponding to a logical zero until the predetermined time period t_max has lapsed, after which it switches to a value corresponding to a logical one.

In the method exemplified in FIG. 9, the automatic reception of the incoming call was deactivated when the keypad 99 was influenced in one of a number of predetermined ways, which also resulted in that the incoming call was processed directly in dependence of which predetermined way the keypad 99 was influenced. It is of course also possible to define in other ways what a predetermined influence is—and thereby form a basis for when the reception of the incoming call is to be deactivated. For example, the predetermined influence could be defined as a pushing of the number one key. When the number one key is pressed the automatic reception of the incoming call is deactivated. The user then has access to the keypad and is thus free to push any key, e.g. SEND, END, 0 SEND or anything else and thereby decide in which way the incoming call is to be processed.

What is claimed is:

1. Mobile telephone terminal comprising:
   at least two parts movably arranged to each other;
   a keypad arranged by at least one of the at least two parts where the at least two parts can be arranged in a first position and a second position relative to each other, where the keypad is accessible in the first position and inaccessible in the second position;
   a first detector arranged to generate a first detector signal, when the mobile telephone is in an active state, corresponding to whether the at least two parts are arranged in either one of the first position and the second position; and
   a second detector arranged to generate a second detector signal, when the mobile telephone is in an active state, corresponding to whether the second detector is in either one of an engaged state or a disengaged state, wherein said mobile telephone terminal is arranged to decide, in dependence on the first detector signal and the second detector signal, whether to automatically receive the incominig call.

2. Mobile telephone terminal according to claim 1, wherein said second detector further includes a push-key.

3. Mobile telephone terminal according to claim 2, wherein said push-key further includes a volume key for controlling the sound volume of the mobile telephone terminal.

4. Mobile telephone terminal according to claim 1, wherein said second detector is attached to an antenna that can be in either one of a retracted position and an extracted position.

5. Mobile telephone terminal according to claim 4, wherein said antenna is in the engaged state when in the retracted position.

6. Mobile telephone terminal according to claim 1, wherein said mobile telephone terminal is arranged to automatically receive the incoming call when the first detector signal indicates that the at least two parts have been arranged in the first position and the second detector signal indicates that the second detector was in the disengaged state while the at least two parts were arranged in the first position.

7. Mobile telephone terminal according to claim 1, wherein said mobile telephone terminal is arranged to decide to automatically receive the incoming call when the first detector signal indicates that the at least two parts have been arranged in the first position and the second detector signal indicates that the second detector was in the disengaged state during a predetermined time period before the parts were arranged in the first position.

8. Mobile telephone terminal according to claim 1, further comprising means for delaying the automatic reception of the incoming call during a predetermined time period after the first detector signal indicates that the at least two parts have been arranged in the first position, where the mobile telephone terminal is arranged to deactivate the automatic reception of the incoming call in case a keypad is influenced in at least one predetermined way before the predetermined time period has lapsed.

9. Mobile telephone terminal according to claim 1, wherein said means for delaying the automatic reception further includes a timer arranged to generate a timer signal indicating either one of the cases that the predetermined time period has lapsed and that the predetermined time period has not lapsed.

10. Method used with a mobile telephone terminal having at least two parts movably arranged to each other, and a keypad arranged by at least one of the at least two parts, where the at least two parts can be arranged in a first position and a second position relative to each other, and the keypad is accessible in the first position and inaccessible in the second position, said method comprising the steps of:

generating a first detector signal, when the mobile telephone is in an active state, corresponding to an arrangement of the at least two parts in either one of the first position and the second position;

generating a second detector signal, when the mobile telephone is in an active state, corresponding to whether an engaging element is in either an engaged state and a disengaged state; and determining whether to automatically receive an incoming call in dependence on the first detector signal and the second detector signal.

11. Method according to claim 10, wherein said step of determining further includes receiving the incoming call when the first detector signal indicates that the at least two parts have been arranged in the first position and the second detector signal indicates that the engaging element was in the disengaged state while the at least two parts were arranged in the first position.

12. Method according to claim 10, wherein said step of determining further includes receiving the incoming call when the first detector signal indicates that the at least two parts have been arranged in the first position and the second detector signal indicates that the engaging element was in the disengaged state during a predetermined time period before the at least two parts were arranged in the first position.

13. Mobile telephone terminal according to claim 1, further comprising means for delaying the automatic reception of the incoming call during a predetermined time period after the first detector signal indicates that the at least two parts have been arranged in the first position, where the mobile telephone terminal is arranged to deactivate the automatic reception of the incoming call in case a keypad is influenced in at least one predetermined way before the predetermined time period has lapsed.

* * * * *